(12) United States Patent
Folkenberg et al.

(10) Patent No.: US 8,593,637 B2
(45) Date of Patent: Nov. 26, 2013

(54) SPECTROMETRIC INSTRUMENT

(75) Inventors: Jacob Riis Folkenberg, Hilleroed (DK); Hans Larsen, Hoersholm (DK)

(73) Assignee: Foss Analytical A/S, Hilleroed (DK)

( * ) Notice: Subject to any disclaimer, the term of this patent is extended or adjusted under 35 U.S.C. 154(b) by 0 days.

(21) Appl. No.: 13/583,534

(22) PCT Filed: Apr. 26, 2012

(86) PCT No.: PCT/EP2012/057631
§ 371 (c)(1),
(2), (4) Date: Sep. 7, 2012

(87) PCT Pub. No.: WO2012/150172
PCT Pub. Date: Nov. 8, 2012

(65) Prior Publication Data
US 2013/0188192 A1 Jul. 25, 2013

(30) Foreign Application Priority Data
May 2, 2011 (WO) ................. PCT/EP2011/056934

(51) Int. Cl.
*G01B 9/02* (2006.01)
*G01J 3/45* (2006.01)

(52) U.S. Cl.
USPC ........................................................ 356/452

(58) Field of Classification Search
USPC ............ 356/451, 452, 455, 456; 250/339.07, 250/339.08
See application file for complete search history.

(56) References Cited

U.S. PATENT DOCUMENTS

| | | | |
|---|---|---|---|
| 4,444,501 A * | 4/1984 | Schwiesow | 356/452 |
| 5,539,518 A * | 7/1996 | Bennett | 356/452 |
| 6,654,125 B2 | 11/2003 | Maynard et al. | |
| 7,034,944 B2 * | 4/2006 | Rapp et al. | 356/451 |
| 7,894,072 B1 | 2/2011 | Rubin | |
| 8,169,616 B2 * | 5/2012 | Johnson et al. | 356/452 |
| 2003/0189709 A1 | 10/2003 | Maynard et al. | |
| 2008/0290279 A1 | 11/2008 | Juhl | |
| 2012/0002210 A1 | 1/2012 | Andersen et al. | |

FOREIGN PATENT DOCUMENTS

WO WO-2010124723 A1 11/2010

\* cited by examiner

*Primary Examiner* — Michael A Lyons
(74) *Attorney, Agent, or Firm* — Harness, Dickey & Pierce, P.L.C.

(57) ABSTRACT

A spectrometric instrument comprising: a scanning interferometer having a beamsplitter for dividing incident optical radiation into a reflected beam, following a reflected beam path and a transmitted beam following a transmitted beam path; a monochromatic optical radiation source for launching a reference beam into the interferometer along a first propagation path to be initially incident on a first face of the beamsplitter; an observation optical radiation source for launching a divergent observation beam into the interferometer along a second propagation path to be initially incident on the first face of beamsplitter and overlap the reference beam at the first face; wherein the radiation sources cooperate to generate a first angle between the directions of propagation of the two beams along respective first and second propagation paths when initially and simultaneously incident at the first face which is larger than a divergence half-angle of the observation beam 64.

8 Claims, 4 Drawing Sheets

SPECTROMETRIC INSTRUMENT

BACKGROUND

The present invention relates to a spectrometric instrument comprising a scanning interferometer and more particularly comprising a scanning interferometer operating according to the Michelson principle or a principle derived there from (generally referred to in this specification as a "Michelson type" interferometer).

Known scanning interferometers, such as those of the Michelson type, generally comprise a beamsplitter (typically also including a compensator) and two or more reflectors, such as mirrors or retro-reflectors, with at least one of the reflectors being arranged to be reciprocally translatable. Collimating lenses or other optics may also be associated with the interferometer but are not fundamental to its operating principle which relies essentially on the presence of a beamsplitter and relatively movable reflectors.

It is understood that a scanning interferometer refers to an optical arrangement in which a beam is first split by a beamsplitter into two components which are subsequently recombined to interfere with one another after each having traversed a different path that is delimited by a respective one of a pair of relatively moveable reflectors. Information may then be derived from the spectral contents of the interference which relates to a property of a sample with which the beam has interacted.

When such an interferometer is, for example, employed in a spectrometric instrument for optical spectroscopy, an observation beam consisting of relatively broad band radiation in a wavelength region of interest is launched into the interferometer to strike the beamsplitter. In this context the term "launched" refers to a beam being transmitted from a last optical element, such as a light source, a fiber optic end, a lens or other optical element which may affect the beam path or shape. This observation beam is split into essentially two parts of equal intensity at the beamsplitter. A first beam is reflected by the beamsplitter and travels along a first 'arm' of the interferometer to the first reflector from where it is reflected back to the beamsplitter. A second beam is transmitted through the beamsplitter and travels along a second 'arm' to the second reflector from where it is also reflected back to the beamsplitter to overlap the reflected first beam. The retardation, $\delta$, is the difference between the optical path lengths of the two arms and depending on the retardation each wavelength of the spectral source may interfere destructively or constructively when the back-reflected light in the two arms overlap on the beamsplitter. The intensity pattern of the overlapping, interfering light as a function of retardation is known as an interferogram. The interferogram is recorded by a detector as the one or more reflectors are moved to create cyclic excursions of the related optical path and hence a cyclic optical path length difference between the first and the second beams. As a result of this each wavelength in the observation beam is modulated at a different frequency. Spectral information may then be extracted from this observation interferogram by numerically performing a Fourier transform (FT).

When recording an observation interferogram, particularly when using the so-called Fast FT technique, the sampling of the output of the associated detector at exact equidistant positions of the translatable reflector is critical for avoiding error.

It has become a well established practice in FT spectroscopy to use a monochromatic source of radiation of known wavelength, $\lambda$, such as a laser, to generate a reference beam. This reference beam is employed in the scanning interferometer to determine the required exact equidistant positions and one such FT interferometer is disclosed in U.S. Pat. No. 6,654,125. Here, as is common, the reference beam is launched into the scanning interferometer simultaneously with the observation beam and is made to follow a light path through the optical components of the interferometer that is substantially parallel to that followed by the observation beam. As with the observation beam the reference beam is split into two beams of substantially equal intensity by the beamsplitter. A reference interferogram is generated by the two back-reflected portions of reference beam upon their overlap at the beamsplitter to be detected by an associated detector. This reference interferogram is sinusoidal having a period of oscillation on the retardation axis $\delta_{per}$, that is directly related to the wavelength as: $\delta_{per}=\lambda/2$ (1)

Since the wavelength of the reference beam is accurately known then periodically occurring features, such as zero crossing positions, of the reference interferogram can be employed to accurately determine the incremental displacement and/or velocity of the translatable reflector in the interferometer. Thus the sampling time for the observation interferogram may be accurately determined.

A problem associated with the known scanning interferometer design is that the launch of the reference beam into the interferometer either requires additional optical components or obstructs the observation beam path. The reference beam may, for example, be launched by using periscope mirrors or through a hole in any collimating optics for the observation beam. In both cases however, a part of the observation beam is blocked. Alternatively, the reference beam may be launched into the interferometer using a dichroic mirror but this also gives rise to a reduction in the total power of the observation beam through the interferometer and also requires space in the observation beam path.

SUMMARY

According to a first aspect of the present invention there is provided a spectrometric instrument comprising: a scanning interferometer having a beamsplitter for dividing incident optical radiation into a reflected beam and a transmitted beam; a monochromatic optical radiation source for launching a reference beam into the interferometer to be initially incident on a first face of the beamsplitter; an observation optical radiation source for launching an observation beam into the interferometer to be initially incident on the first face of beamsplitter and overlap the reference beam at the first face; wherein the radiation sources cooperate to generate a first angle between propagation paths of the two beams at the first face which is larger than a co-planar divergence half-angle of the observation beam.

It is well known that all radiation beams have a divergence angle which describes the extent of a widening of the beam with distance. It may be considered, for example, as the angle between two directions on opposite sides of an axis of a light beam parallel to the beam path and in the same plane as the axis at which the light intensity typically equals a stated percentage of a reference intensity. If the beam has been collimated using a lens or other focusing element, the divergence expected can be calculated in a known manner from two parameters: the diameter, D, of the narrowest point on the beam before the lens, and the focal length of the lens, f. The divergence half-angle is, as its name implies, an angle whose magnitude is half that of the divergence angle.

Thus by introducing the reference and observation beams into the interferometer such that the angle between their directions of propagation at the first face of the beamsplitter on which they are both initially incident is larger than the co-planar divergence half angle of the observation beam, it is possible to launch the reference beam from outside of the observation beam to overlap with the observation beam at the first face of beamsplitter without the need of any additional optical components; without obstructing the observation beam and without the need for increasing size of beamsplitter and the other optical components.

Moreover, the angling of the beam paths according to the present invention provides a spatial filtering of the reference beam and the observation beam so that an instrument may be designed in which background radiation at an associated detector due to the other beam is significantly reduced or even eliminated.

Usefully, a computer is employed to extract spectral information from the observation interferogram recorded by an associated detector and is specifically adapted to compensate mathematically for wavelength errors introduced in the spectral information due to the relative angling of the reference and observation beams according to the present invention. This correction of the wavelength scale which is applied in the computer provides an increased accuracy of the measurements made using the interferometer.

According to a second aspect of the present invention there is provided a method of operating a spectrometric instrument having a scanning interferometer according to the first aspect of the present invention comprising the step of simultaneously launching a reference beam and a divergent observation beam towards the beamsplitter to be initially incident at a first face thereof, the beams being launched to provide at the beamsplitter at a first angle between their optical paths greater than a divergence half-angle of the observation beam.

BRIEF DESCRIPTION OF THE DRAWINGS

An embodiment of the invention will now be described by way of example only and with reference to the drawings of the accompanying figures of which.

DETAILED DESCRIPTION OF EXAMPLE EMBODIMENTS

Figure 1:
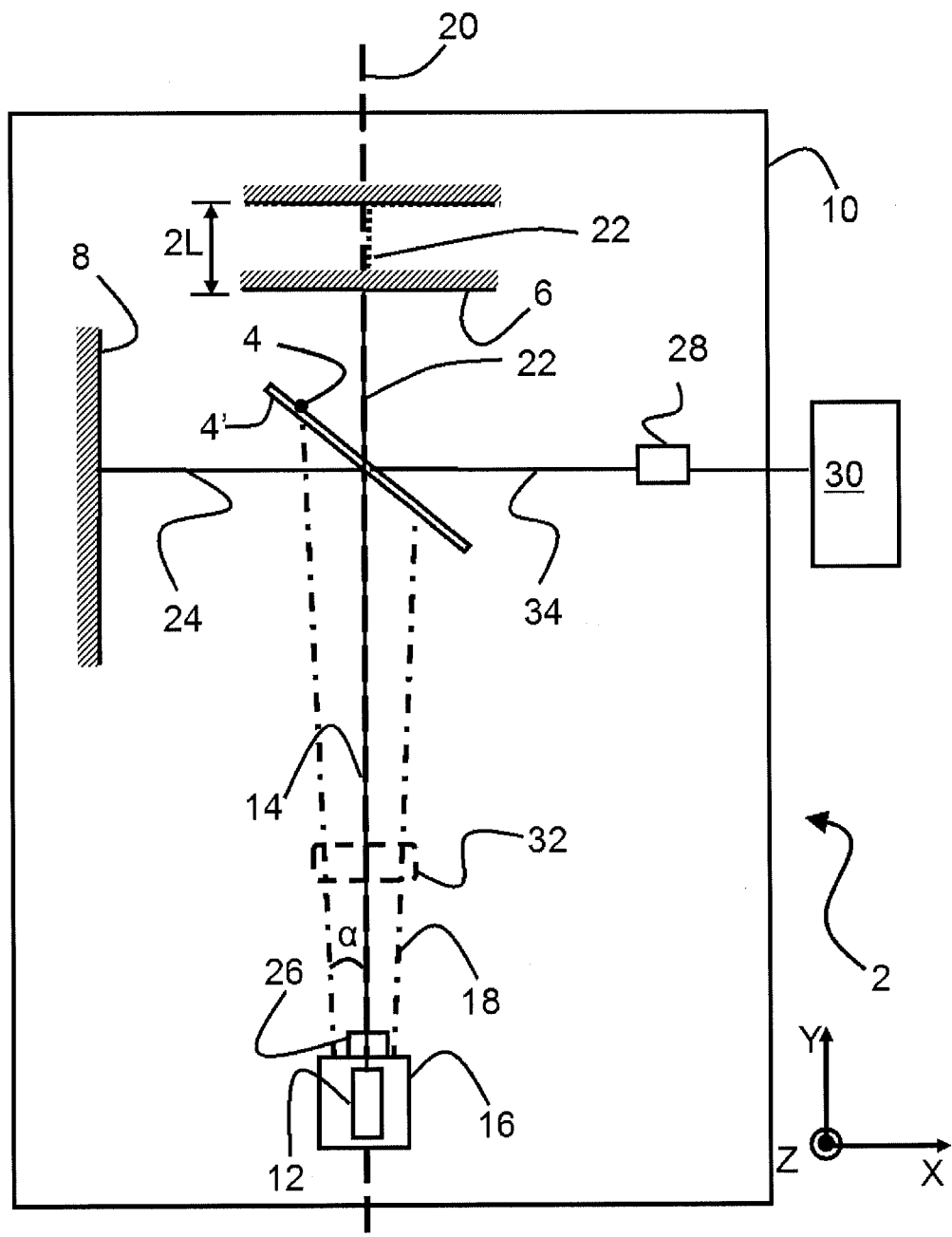
FIG. 1 illustrates a sectional view in the X/Y plane of Michelson type interferometer according to the present invention.
Figure 2:
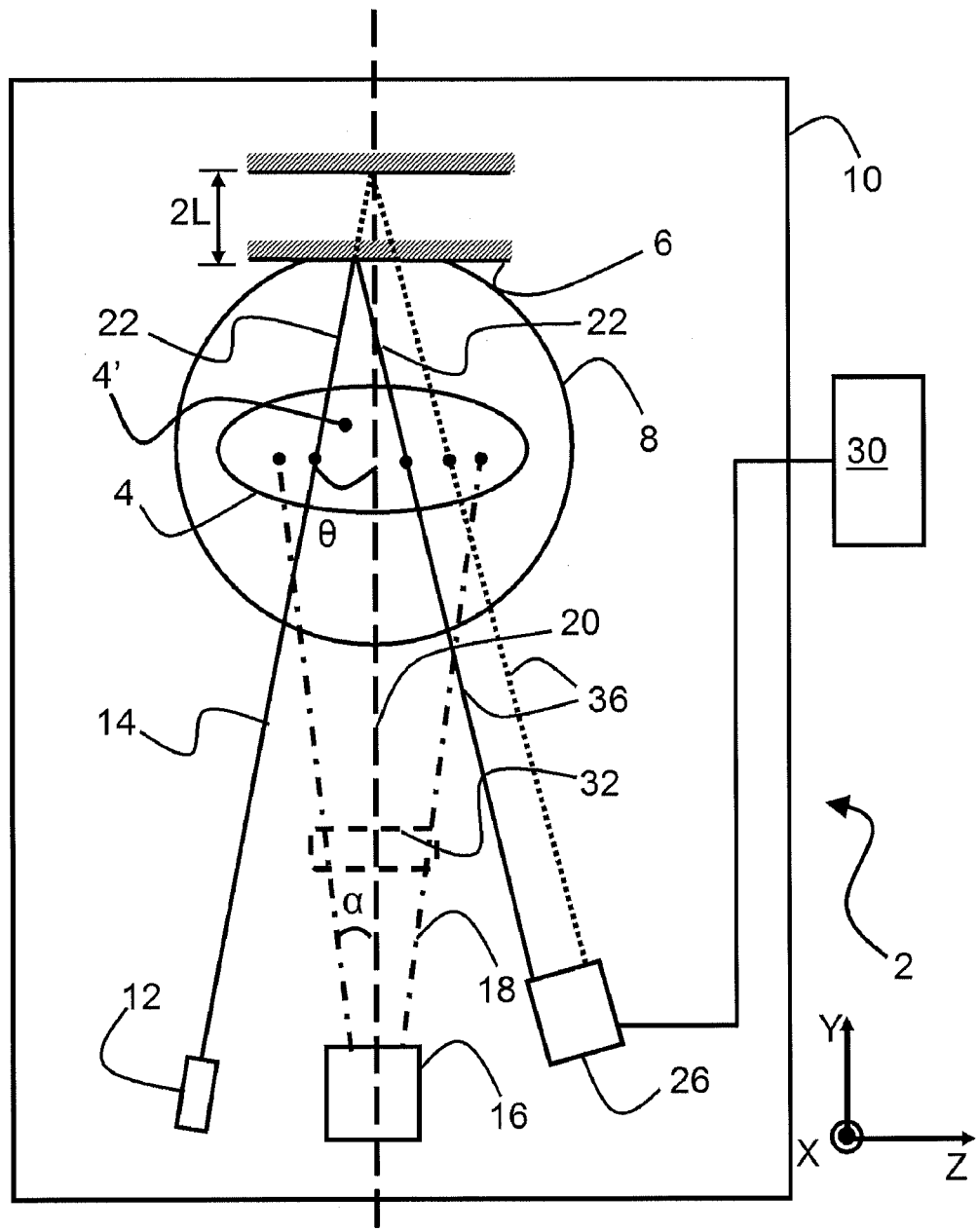
FIG. 2 illustrates a sectional view in the Y/Z plane of the Michelson type interferometer of FIG. 1.

Consider now an exemplary embodiment of a spectrometric instrument 2 according to the present invention which, as is illustrated in FIGS. 1 and 2, is presently configured to comprise a Michelson type scanning interferometer. As the general principle of operation of such a scanning interferometer is well known it will be described here only in such detail as is necessary for an understanding of the present invention. The exemplified scanning interferometer comprises a beamsplitter, here a circular beamsplitter 4, and two reflectors which are here in the form of circular plane-mirrors 6,8. One of the mirrors 6 is mounted for reciprocal translation (illustrated by the double headed arrow) over a distance shown as 2L and the other mirror 8 is fixed. The beamsplitter 4 is, in the present embodiment, enclosed in an interferometer housing 10 together with the two reflectors 6,8. Also comprising the exemplified instrument 2 are a monochromatic optical radiation source 12 for generating a reference beam and launching it generally along a propagation path 14, uninterrupted by additional optical elements, towards a first face 4' of the beamsplitter 4 of the interferometer (4,6,8) and an observation optical radiation source 16 for generating a divergent observation beam 18 and launching it towards the first face 4' of the beamsplitter 4 of the interferometer (4,6,8) generally along a propagation path 20 between the source 12 and the beamsplitter 4 without passing through additional optical elements which would affect the direction of propagation (i.e. propagation path) of this beam 18. It will be appreciated that should other embodiments of an instrument according to the present invention comprise optical elements or other components interposed between the sources 12,16 and the beamsplitter 4 which may alter either of the propagation paths 20,14 then the propagation paths according to the present invention will be the direction of propagation of the appropriate beam between the last of such an optical element and the beamsplitter 4. The term 'launch' will be interpreted accordingly.

As is known, the beamsplitter 4 is considered the first element of the scanning interferometer (4,6,8) and is constructed so that an incident beam will be divided into beams of substantially equal intensity to traverse a transmitted beam path 22 and a reflected beam path 24. The moveable mirror 6 is disposed relative to the beamsplitter 4 to return the beam traversing the transmitted beam 22 path back to the beamsplitter 4 as it is reciprocally translated. The other, fixed, mirror 8 is disposed relative to the beamsplitter 4 to return the beam traversing the reflected beam path 24 back to the beamsplitter 4 to overlap with the returned beam following the transmitted beam path 22 and thereby an interferogram is generated for each of the reference beam from the reference beam source 12 and the observation beam 18 from the observation source 16.

Corresponding reference beam and observation beam radiation detectors 26,28 respectively are also provided as a part of the spectrometric instrument 2. The reference beam radiation detector 26 is disposed in the interferometer housing 10 to detect a reference interferogram generated from the reflected components of launched reference beam which traverses a reference beam path 36. The observation beam radiation detector 28 is likewise disposed in the interferometer housing 10 to detect an observation interferogram generated from the reflected components of the launched observation beam which traverses an observation beam path 34. Usefully and according to an embodiment of the present invention the reference beam radiation detector 26 may be located outside of the observation beam which traverses the beam path 34 from the beamsplitter 4 towards the observation beam detector 28. This allows the available radiation which is incident on the observation beam detector 28 to be maximised and provides for a spatial filtering of the observation beam path 34 and the reference beam path 36 at the respective detectors 28,26. This spatial filtering effect is advantageous in that background noise in the respective detectors 28,26 caused by light from the other beam (i.e. light from the observation beam incident on the reference detector 26 and vice versa) is substantially reduced and may even be eliminated.

These reference beam and observation beam detectors 26,28 are, in the present embodiment, all located within the interferometer housing 10 but it will be appreciated that one or more of these may be located outside the housing 10 and optically coupled, for example by means of suitable optical fibers, into the housing 10. Similarly one or both the monochromatic optical radiation source 12 and the observation optical radiation source 16 may be located outside of the housing 10 and optically coupled into it so as to follow the beam paths as illustrated in FIGS. 1 and 2 and as described herein.

A data processor, such as a suitably programmed computer 30, may be operably connected to each of the reference beam and observation beam radiation detectors 26, 28 to receive signals representative of the respective detected reference interferogram and observation interferogram and to process these signals in order to obtain spectral information from the observation interferogram, typically by subjecting the observation interferogram to a Fourier analysis. In the present embodiment the computer 30 is illustrated as being a single device but it will be appreciated that in the present context computer is to be taken to mean one or more devices configured using conventional programming and electronic engineering techniques to automatically perform the desired calculations. Any one or more of such one or more devices which constitute the data processor 30 may be integral with the housing 10 or may be provided external the housing 10 in local (as illustrated via fixed connection) or remote communication (such as via a telecommunications link, intranet or internet connections).

When the spectrometric instrument 2 is used in optical spectroscopy a transparent or translucent cuvette or other sample holder 32 may be located in the observation beam path 20 and here is configured so as not to alter the general direction of the beam path 20 between the source 16 and the first face 4' of the beamsplitter 4. In the present embodiment, and as an example only, the sample holder 32 is located before the beamsplitter 4 (in the direction of propagation of the observation beam 18 along the path 20) but it may be located after the beamsplitter 4 or even located before the beamsplitter 4 outside of the housing 10 if the observation optical radiation source 16 is also located outside of the housing 10. Certain wavelengths of the observation beam 18 will interact with sample material in the holder 32 more than others. This produces a wavelength dependent variation in intensity of the observation beam 18 which is characteristic of the material in the sample holder 32. This spectral information may be extracted from a deconvolution of the observation interferogram, such as by means of a Fourier transformation, in the computer 30.

The present configuration has an advantage that the displacement of the transmitted portion 22 of the reference beam across the beamsplitter 4 (the walk-off) as the moveable mirror 6 is reciprocally translated is minimised as compared with other relative orientations of the monochromatic optical radiation source 12 and the observation radiation source 16. It will however be appreciated that other relative orientations of the sources 12, 16, about the Y axis (here equivalent to the propagation path 20) may be employed without departing from the invention as claimed.

Not all of the design variables of the interferometer (4,6,8) are independently selectable and the interferometer 2 of FIGS. 1 and 2 may be designed having regard to the design criteria discussed in the following:

Consider the observation beam 18 that is being launched into the interferometer (4,6,8) to be initially incident at the first face 4' of the beamsplitter 4 from the source 16 which, in the present embodiment, is configured and orientated such that the beam divergence is symmetrical about a general direction of the beam propagation 20 (such as defined by the direction of propagation of the beam centre or of the maximum of the beam power distribution). This observation beam 18 has a divergence half-angle, $\alpha$, with respect to this general direction of beam propagation 20. Simultaneously with this the reference beam is being launched into the interferometer (4,6,8) along the reference beam path 14 to be initially incident at the first face 4' of the beamsplitter at an angle, $\theta$, to the propagation path 20 of the observation beam 18 in the plane (here, as illustrated the Z-X plane) containing the divergence half-angle $\alpha$ where, according to the present invention, $\theta > \alpha$. Displacement of the moving mirror 6 varies between $-L$ and $+L$. Thus, the total displacement of the mirror 6 is $L_{tot}=2L$ and the retardation varies between $-2L$ and $2L$. The maximum retardation is $\delta_{max}=2L$.

When the retardation of the interferometer (4,6,8) is zero, the returned components of the reference beam will have a maximum overlap on the beamsplitter 4. However, since $\theta$ is non-zero the returned components of the reference beam will move away from one another on the beamsplitter 4 when the absolute value of the retardation increases above zero. This is the so-called walk-off effect. At the largest absolute retardation, $\delta_{max}$, the distance between the centres of the returned reference beam components is: $2L \sin(\theta) = \delta_{max} \sin(\theta)$ (2)

The amplitude of the reference interferogram is given by the overlap integral of the electric field strength distribution of the two components of the returned reference beam, which means that the amplitude is constant only if $d_{ref} \gg \delta_{max} \sin(\theta)$, where $d_{ref}$ is the full width at half maximum (FWHM) of returned reference beam (ie that traversing the portion of propagation path 22 between mirror 6 and beamsplitter 4) on the beamsplitter 4. The overlap of the magnitudes of the electric field strengths will be reduced due to the walk-off effect, as the two returned beam components move apart on the beamsplitter 4. Preferably, the monochromatic radiation source 12 is a laser source generating a reference beam having a single spatial mode and a beam waist which is located on the first face 4' of the beamsplitter 4. In this manner the phase front of the reference beam is made substantially parallel which maximises the spatial coherence and hence maximises the tolerable walk-off.

If the reference beam is generated having a high spatial coherence, for example a single mode or a diffraction limited beam, then beam walk-off will mainly effect the amplitude of the reference interferogram. In practice, a certain amplitude envelope on the reference interferogram is acceptable, and the requirement on the returned reference beam size, $d_{ref}$, may be relaxed to: $d_{ref} > \epsilon \delta_{max} \sin(\theta)$ (3), where $\epsilon$ is an empirically determined constant, selected such that the signal to noise ratio at the detector 26 is sufficient to permit determinations based on periodically repeating features, typically zero-crossing determinations, to be made from the reference interferogram.

From experiments on a particular configuration of the invention illustrated in FIGS. 1 and 2 and by way of example only, it was found that $\epsilon \approx 50$ was a reasonable value, taking into account typical tolerances in optics and construction. For example if the returned reference beam size is $d_{ref}=2$ mm and $\theta=10$ degrees, the maximum retardation, $\delta_{max}$, should be less than 0.23 mm, to maintain a sufficient amplitude envelope of the reference interferogram.

Another important design constraint exists between the divergence half-angle, $\alpha$, of the observation beam 18, the required spectral resolution of the spectrometric instrument 2, $\Delta\nu$, and the maximum wavenumber, $\nu_{max}$, at which this resolution $\Delta\nu$ is to be achieved. The resolution is inversely proportional to the maximum retardation such. This may be defined as: $\delta_{max}=1/(\Delta\nu)$ (4), the upper limit of the observation beam divergence may be expressed as: $\alpha_{max}=(\delta_{max}\nu_{max})^{-1/2}$ (5)

Thus, if, for example, $\delta_{max}=0.23$ mm (as above) and typically the maximum wavenumber $\nu_{max}=3000$ cm$^{-1}$ the maximum acceptable beam divergence is $\alpha_{max}=0.085$ rad (or 4.9 degrees). The obtained resolution in this case is 22 cm$^{-1}$— limited by the mirror movement.

The example above illustrates the possibility of configuring a scanning interferometer (4,6,8) with a reference beam having an incidence angle θ at the first face 4' of the beamsplitter 4 which is larger than the observation beam divergence half-angle, α, and still obtaining the resolution limited by the mirror movement (retardation). However, it may also be seen that this kind of design is unfavourable for achieving a high resolution as may be appreciated from a consideration of the following: Following the example above, the incidence angle of the reference beam may be reduced to θ=1 degree, to allow for a maximum retardation of 2.3 mm which corresponds to an improved resolution of 2.2 cm$^{-1}$. However, the requirement on the upper limit of observation beam divergence is now $α_{max}$=0.027 rad (or 1.5 degrees), such that $α_{max}$>θ. This means that the design of FIGS. 1 and 2 cannot be realized, or that the maximum solid angle of the observation beam cannot be utilized. In the latter case, the light energy throughput is reduced which reduces the signal-to-noise ratio on the detector.

Figure 3:
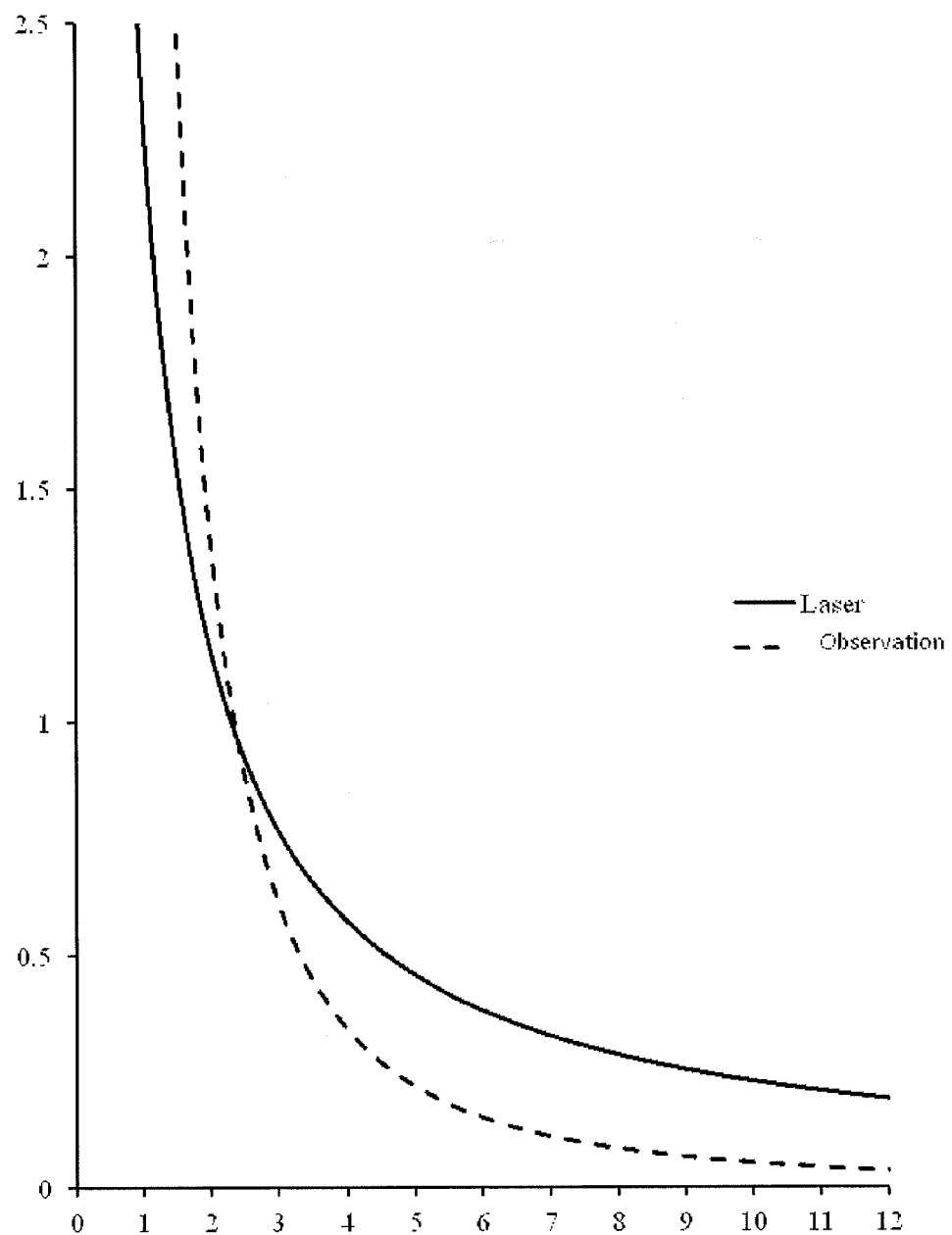
FIG. 3 illustrates graphically design criteria constraints on the interferometer illustrated in FIGS. 1 and 2.

The two examples described above are illustrated in the general plot in FIG. 3. The x-axis shows the incidence angle of the laser reference beam and divergence angle of the observation beam respectively, and the y-axis shows the corresponding maximum retardation, assuming a laser spot size of d=2 mm and a maximum wavenumber of $ν_{max}$=3000 cm$^{-1}$. The low and high resolution designs described above are shown with dashed lines. The plot shows that for the parameters used here, it is only possible to have a laser (reference source) incidence angle larger than the divergence angle, if the maximum retardation is smaller than approximately 1 mm. For a larger retardation, i.e. a higher resolution, it is not possible to take advantage of the full solid angle of the observation beam 18.

Another potential limitation in the accuracy of the interferometer 2 according to the present invention, is the apparent shift of the wavelength as given by the period of the reference interferogram compared to the physical wavelength, λ, of the monochromatic reference beam. With an incidence angle of θ the retardation of the reference beam is a factor of $\cos(θ)^{-1}$ longer than the movement of mirror 6. Thus the reference interferogram will contain a factor of $\cos(θ)^{-1}$ more zero-crossings (or other periodically occurring features) than for a zero degree angle of incidence reference beam and will look like a source with a wavelength of $(\cos(θ)·λ)$ Since, from the design of the interferometer, θ is known with a high accuracy such that a correction factor may be readily calculated in order to compensate for this apparent wavelength shift.

In an embodiment of the present invention this correction factor is employed in the computer 30 when determining the sampling time for the observation interferogram.

It is known from, for example US2008/0290279, to correct the wavelength scale of spectral information extracted from the interferogram based on measurements of a reference sample having a spectra pattern comprising features with known characteristic wavelength(s). In that publication the spectral pattern associated with $CO_2$ in air within the interferometer is employed for this purpose and is recorded as a component of the observation interferogram. Thus according to the present invention correction of the wavelength scale within the computer 30 may be done using one or both spectral patterns from reference samples and a factor dependent on the incidence angle, θ, of the reference beam at the beamsplitter 4.

Figure 4:
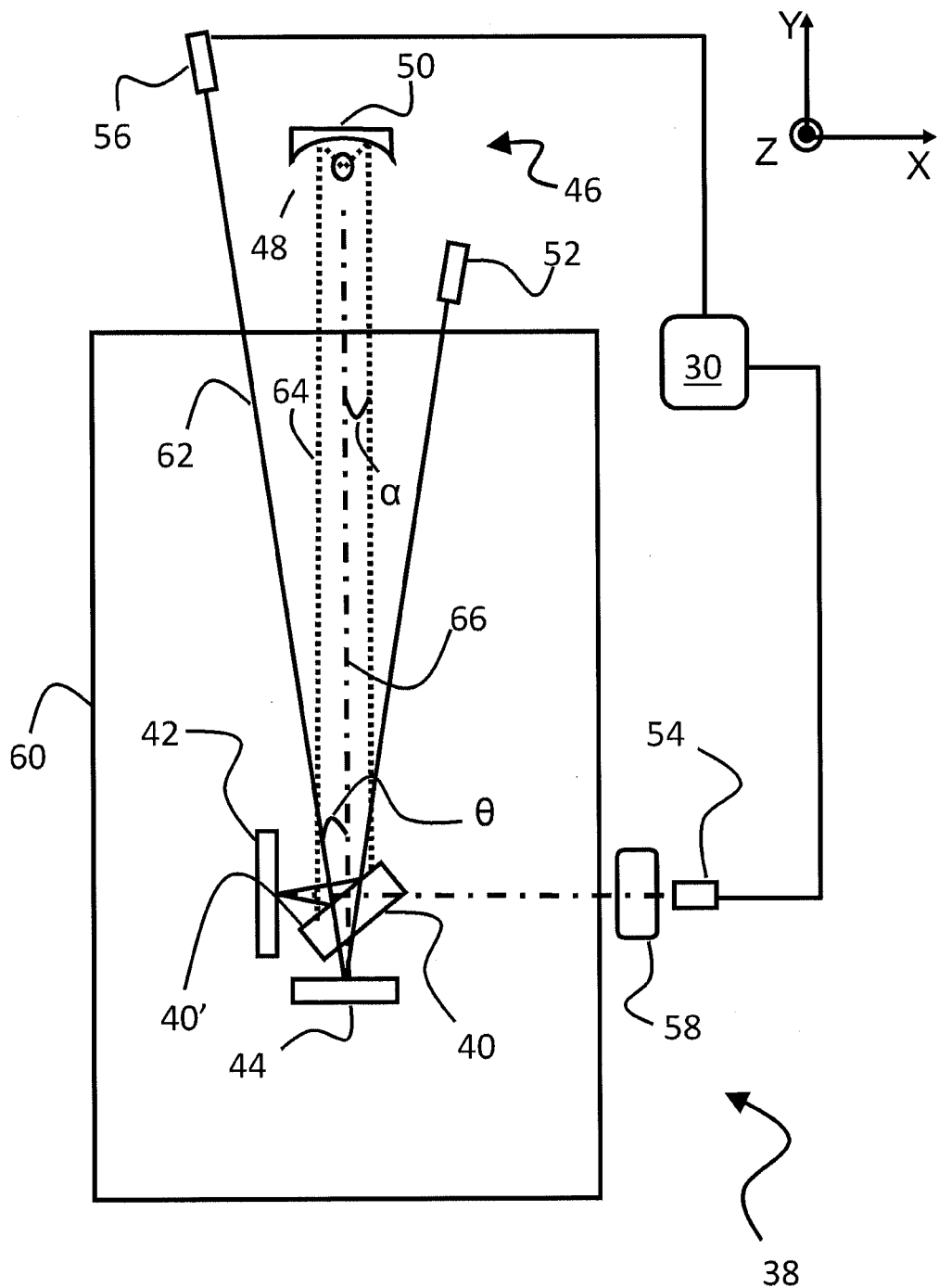
FIG. 4 illustrates a sectional view of a further embodiment of a Michelson type interferometer according to the present invention.

A further exemplary embodiment of a spectrometric instrument 38 according to the present invention is illustrated in FIG. 4. The spectrometric instrument 38 is generally similar in construction to that instrument 2 illustrated in FIG. 1 and comprises a beamsplitter 40, a fixed mirror 42 and a moveable mirror 44 which are configured in a Michelson type interferometer geometry as described above in respect of the instrument 2 of FIG. 1. In the present embodiment the beamsplitter 40, and mirrors 42, 44 are co-planar with an observation optical radiation source 46 (here comprising an emission source 48 and a co-operable concave focussing element 50) and a reference radiation source 52 (such as a monochromatic laser radiation source). Here the radiation sources 46, 52 are, together with associated observation beam detector 54 and reference beam radiation detector 56 (and, as illustrated in the present embodiment a sample cuvette 58 and suitably programmed computer 30) are located external of an interferometer housing 60 in which the beamsplitter 40 and mirrors 42, 44 are located. In one realization of the present embodiment according to FIG. 2 one or more of the sources 46, 48 and detectors 54, 56 will be optically coupled to the interferometer housing via fiber optic cables or other suitable waveguides (not shown) to allow for a more flexible spectrometric instrument 38 configuration.

As also described in relation to the instrument 2 of FIG. 1, here the monochromatic reference radiation source 52 generates a reference beam and launches it along a propagation path 62 within the interferometer housing 60 which is uninterrupted by additional optical elements that would cause a deviation in the propagation path 62 to initially strike a first face 40' of the beamsplitter 40. The observation optical radiation source 46 generates a divergent observation beam 64 to traverse a propagation path 66 and initially strike the first face 40' of the beamsplitter 40 in the presence of the reference beam. The observation beam 64 which is launched into the interferometer (40,42,44) has a divergence half-angle α with respect to its propagation path 66 and the propagation path 62 of the reference beam is provided at an angle θ to the propagation path 66 of the observation beam 64, where according to the present invention θ>α.

The spectrometric instrument 38 according to the second embodiment of the present invention has been realized with the following design parameters:

Observation Source 46: Mirror 50 focal length, f, =14 mm Emission Source 48 diameter, d=2 mm Divergence angle, 2α, =d/f=8.2° Divergence half-angle, α, =4.1°

Laser, Monochromatic Reference Source 52: Incidence angle, θ, =18°

Interferometer 40, 42,44: Max optimal retardation, $δ_{max}$=2L=2*0.24 mm=0.048 mm Max(observation) wavenumber, $ν_{max}$=3300 cm$^{-1}$ Resolution limited divergence, $α_{max}$=(2*0.024*3300)$^{-1/2}$=4.6° Assuming ε=10, then from equation (3), $d_{ref}$=1.5 mm Thus $α_{max}$>α and the laser spot size is larger than 1.5 mm as is required by the present invention.

The invention claimed is:

1. A spectrometric instrument comprising: a scanning interferometer having a beamsplitter for dividing incident optical radiation into a reflected beam and a transmitted beam; a monochromatic optical radiation source for launching a reference beam into the interferometer along a first propagation path to be initially incident on a first face of the beamsplitter; an observation optical radiation source for launching an observation beam into the interferometer along a second propagation path to be initially incident on the first face of beamsplitter and overlap the reference beam at the first face; wherein the radiation sources cooperate to generate a first angle between respective first and second propagation paths at the first face which is larger than a divergence half-angle of the observation beam.

2. A spectrometric instrument as claimed in claim 1 further comprising a reference detector for detecting a reference interferogram generated from the launched reference beam and observation detector for detecting an observation interferogram from the launched observation beam wherein each detector is located outside the beam path of the other beam.

3. A spectrometric instrument as claimed in claim 2 further comprising data processor operably connected to receive an output from each of the detectors corresponding to the detected interferograms wherein the data processor is specifically adapted to process the received outputs to correct for errors in spectral information extracted from the observation interferogram detected by the observation detector resulting from having launched the reference beam at the first angle.

4. A spectrometric instrument as claimed in claim 3 wherein the reference beam has a beam diameter and monochromatic radiation source is configured to launch the reference beam at the first angle correlated with the beam diameter to achieve a degree of overlap at the first face of the beamsplitter selected to provide a minimum signal to noise ratio of the output from the reference detector as the mirror is translated sufficient to enable determination within the data processor of periodically repeating features from the reference interferogram.

5. A method of operating a spectrometric instrument as claimed in claim 1 comprising the step of:
simultaneously launching a reference beam from the monochromatic radiation source and a divergent observation beam from the observation optical radiation source along respective propagation paths towards the first face of the beamsplitter of the interferometer, the reference beam being launched along its propagation path to be incident at the first face at a first angle with respect to the propagation path of the observation beam which is greater than a divergence half-angle of the observation beam.

6. A method as claimed in claim 5 further comprising the step of processing in a data processor an interferogram obtained from the observation beam to correct spectral information derivable therefrom for errors resulting from having launched the reference beam at the first angle.

7. A method as claimed in claim 6 wherein the correction comprises compensating for the reference beam having an apparent wavelength which differs from an actual wavelength by a factor of cosine of the first angle.

8. A method as claimed in claim 5 further comprising the steps of passing the observation beam through a sample material; and processing in the data processor the interferogram obtained from the observation beam to extract spectral information characteristic of the sample material.

* * * * *